Sept. 5, 1933.  A. M. NIVEN  1,925,906
VALVE GEAR OF INTERNAL COMBUSTION ENGINES
Filed Feb. 20, 1924   3 Sheets-Sheet 1
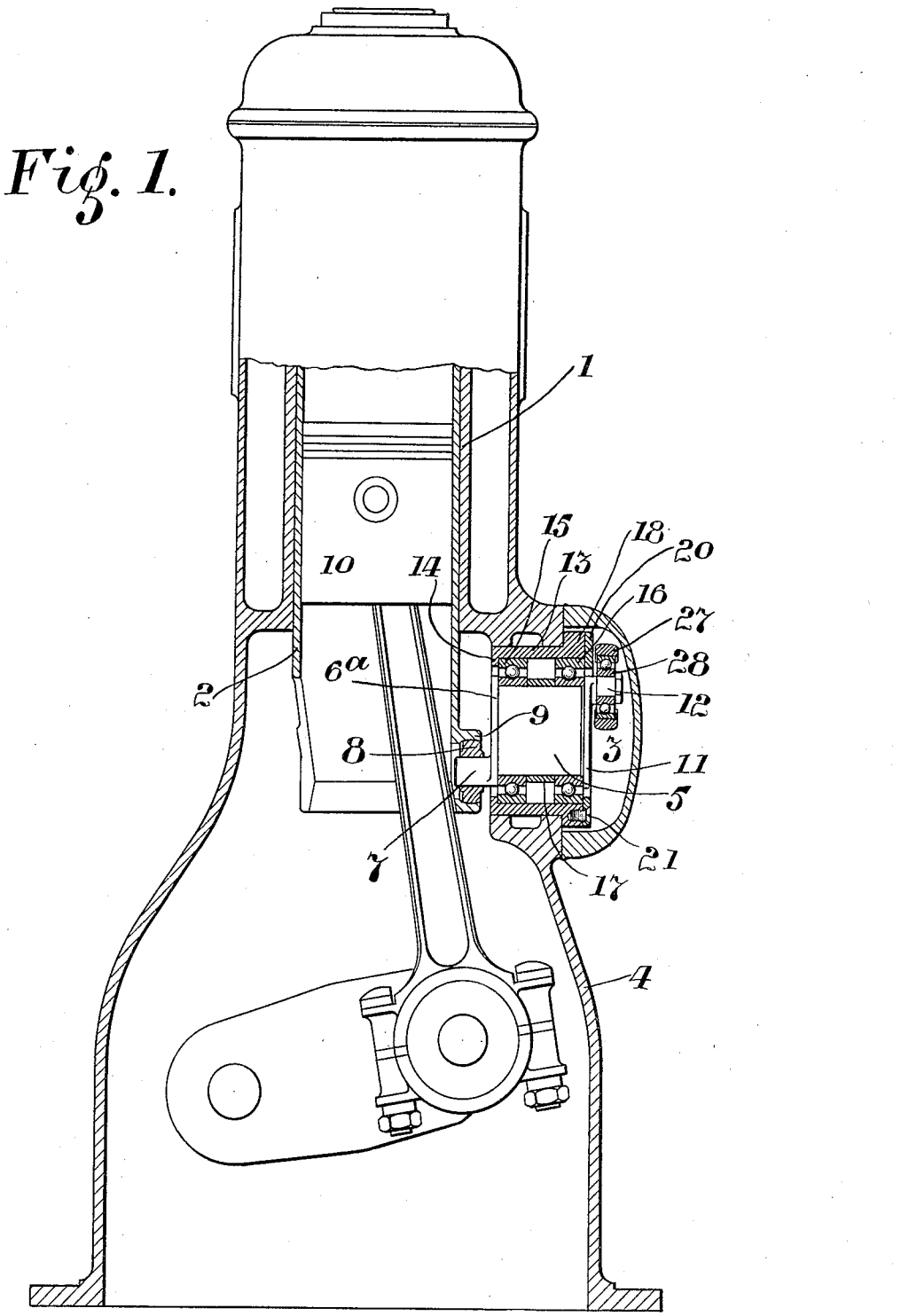

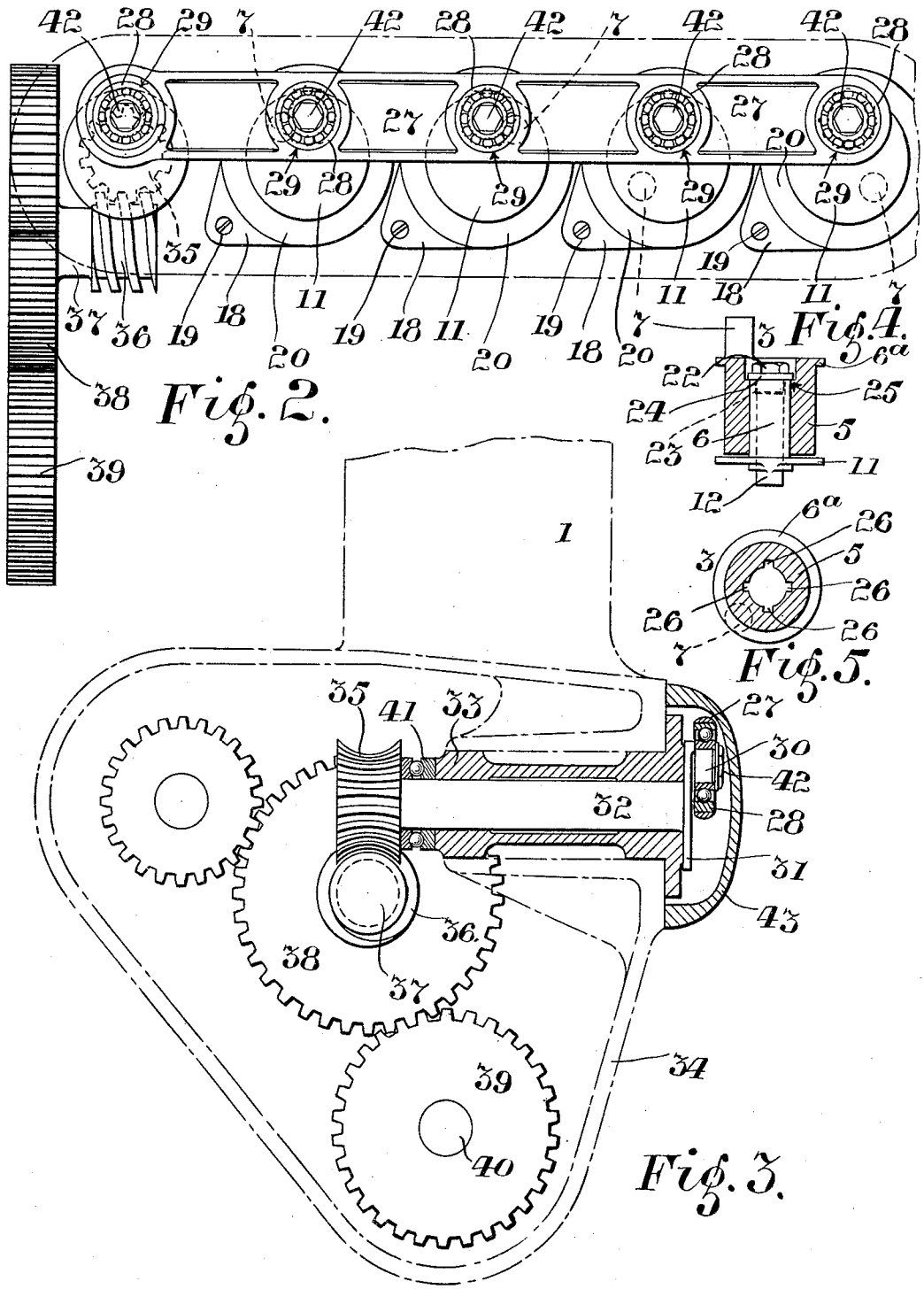

Sept. 5, 1933.        A. M. NIVEN        1,925,906
VALVE GEAR OF INTERNAL COMBUSTION ENGINES
Filed Feb. 20, 1924        3 Sheets-Sheet 3
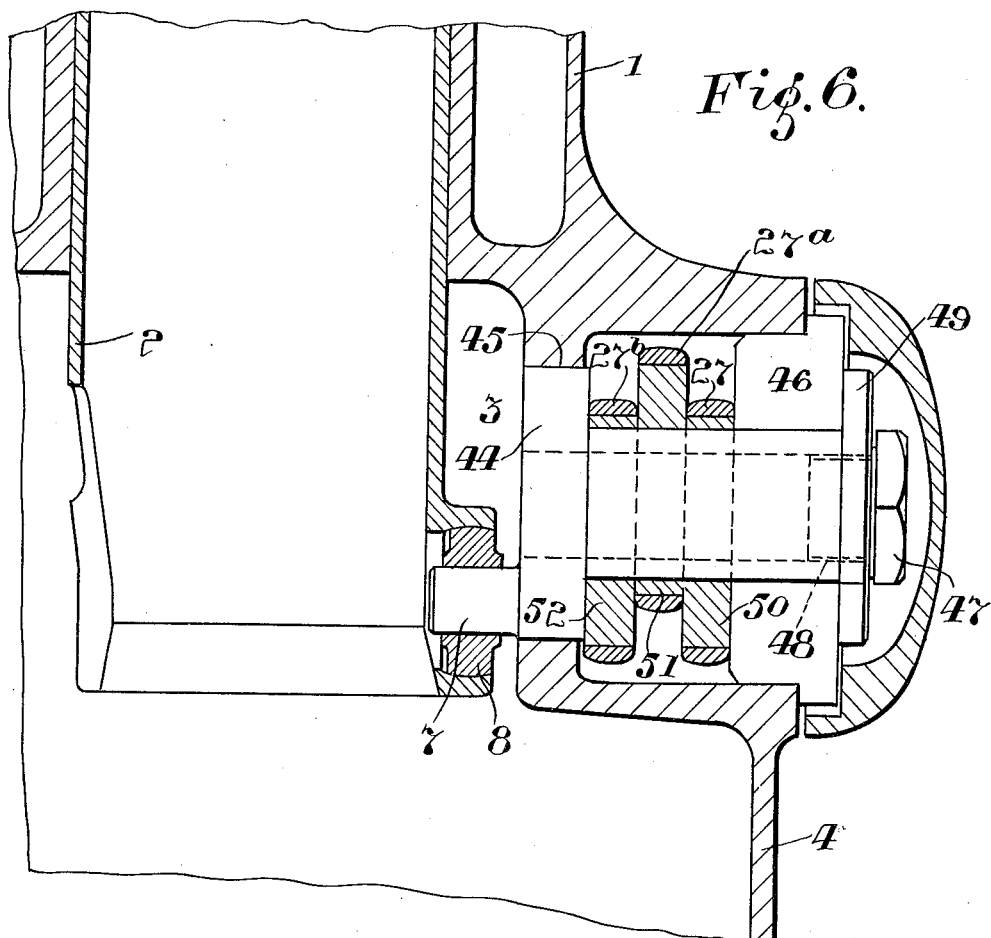
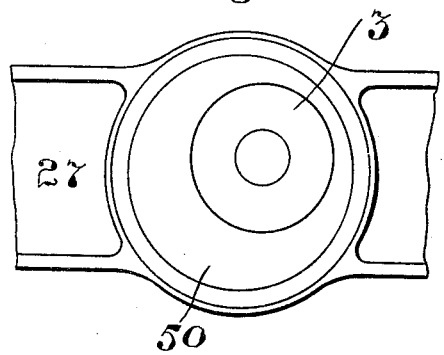
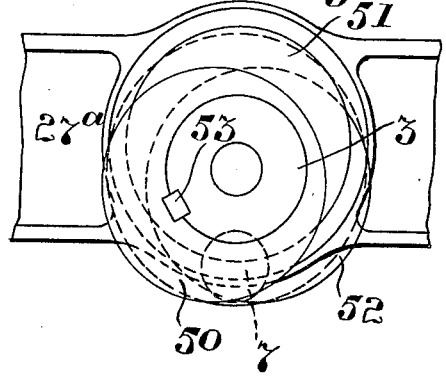

Patented Sept. 5, 1933

1,925,906

UNITED STATES PATENT OFFICE 1,925,906

VALVE GEAR OF INTERNAL COMBUSTION ENGINES

Archie Macphail Niven, Glasgow, Scotland, assignor, by mesne assignments, to Continental Motors Corporation, Detroit, Mich.

Application February 20, 1924, Serial No. 694,086, and in Great Britain December 8, 1923

5 Claims. (Cl. 123—81)

The present invention relates to multi-cylinder internal combustion engines of the type wherein the inlet of the combustible charges and the exhaust of the burnt gases are controlled by sleeve valves.

At present it is usual to drive each sleeve valve separately by means of gears each operated from a common valve shaft.

The object of the invention is to provide improved and much simplified means for driving the sleeve valves and to this end according to this invention, the sleeve valves are connected together and driven collectively and simultaneously by a coupling member or rod which, in its turn, is driven by a single valve gear, the usual half speed shaft and its valve gears being dispensed with.

The coupling member is preferably engaged with rotatably mounted sleeve valve driving members, which latter are so constructed as to allow of the order of firing of the cylinders being changed without altering the gearing between the engine crank shaft and the sleeve valve driving shaft. In this case, the sleeve valve driving members may comprise an inner and an outer member operably connected and so arranged that the inner member can occupy a desired number of different positions relatively to a fixed point on the outer member.

It is obvious that if so desired two, or more, coupling members may be used.

In order that the invention may be clearly understood, reference is made to the annexed drawings whereon are illustrated, by way of example, two constructional forms of the invention applied to a multi-cylinder engine of the kind in which the sleeve valves are driven with a combined oscillatory and reciprocatory motion.

On the drawings:—

Fig. 1 is a part sectional end elevation through one of the cylinders of the engine.

Fig. 2 is a front view showing the engagement of the coupling rod with the sleeve valve driving members and with the sleeve valve driving shaft.

Fig. 3 is an end view, partly in section, corresponding to Figure 2, and shows the method of driving the sleeve valve driving shaft.

Fig. 4 is a partly sectioned view showing the method of assembling the two parts of a sleeve valve driving member.

Fig. 5 is a section through the outer part of the sleeve valve driving member.

Fig. 6 is a sectional end view of a modified construction in which three coupling rods are used; and Figs. 7 and 8 are front views showing the engagement of the coupling rods with eccentrics secured to the sleeve valve driving member.

Referring firstly to Figs. 1 to 5:—

The engine comprises four cylinders 1, in each of which a single sleeve valve 2 is oscillatably and slidably arranged, pistons 10 being slidably arranged in the sleeve valves. The sleeve valves are simultaneously reciprocated and oscillated within the cylinders by means of sleeve valve driving members 3 rotatably mounted in a side wall of the engine crank case 4. Each sleeve valve driving member, see Figs. 4 and 5, comprises an outer part 5 and an inner part 6, said outer part being formed with a flange 6$^a$ whereon is a projection or crank pin 7 off-set from the centre of said flange and slidably engaging in a bearing plate 8 mounted for universal movement in an aperture formed in a lug 9 on the lower part of the sleeve valve. The inner part 6 of the sleeve valve driving member is formed with a flange 11 on which is a projection or crank pin 12 off-set from the centre of the flange, whose purpose will be explained hereafter.

Housings 13 are fitted in apertures in the crank case side wall, see Figure 1, and each is provided at its inner end with a check or ring 14 against which one side of a ball bearing 15, provided in said housing, is fitted. The outer part 5 of each sleeve valve driving member is arranged within the ball bearing 15 and within a ball bearing 16 disposed in the housing 13 but separated from the ball bearing 15 by means of a distance piece 17. The housings 13 are formed with flanges 18 fixed to the crank case side wall by means of set screws 19. Plates 20 are secured to the flanges 18 by set screws 21 and overlap the ball bearings 16, thus preventing any lateral movement of the ball bearings 15 and 16 and the distance pieces 17.

As will be seen in Figures 4 and 5, the outer parts 5 of the sleeve valve driving members 3 are bored to receive the inner parts 6, each of which is secured to the outer part by means of a screw 22 engaging a threaded aperture 23 and bearing on a washer 24 engaging a check or shoulder 25 formed in the bore of the part 5. The part 5 is formed with four keyways 26 any one of which is adapted to be engaged by a key provided on the inner part 6. When the screws 22 are tightened the flanges 11 of the inner parts 6 bear against the outer ball bearings 16, so that, owing to the flanges 6$a$ on the inner parts engaging the ball bearing 15, see Fig. 1, the two parts of each sleeve valve driving member are held securely together.

A coupling rod 27, Fig. 2, is provided with ball bearings 28, each of which is arranged in an aperture 29 formed in the coupling-rod, four of said ball bearings engaging the crank pins 12 on the inner parts 6 of the sleeve driving members, whilst the fifth engages a crank pin 30 formed on, and off-set from the centre of, a flange 31 on a sleeve valve driving shaft 32 rotatably arranged in a bearing 33 fixed in a gear cover 34 formed on the engine crank case. The inner end of said shaft is provided with a worm wheel 35 which engages a worm 36 on a shaft 37, whereon is also a two to one gear wheel 38 engaging a toothed pinion 39 provided on the engine crank shaft 40. A thrust bearing 41, Fig. 3, is interposed between the worm wheel 35 and the inner end of the bearing 33. The coupling rod 27 is held in position on the crank pins 30 and 12 by means of set screws 42 which are screwed into threaded apertures provided in said pins and bear against the coupling rod. The coupling rod and its appurtenances are enclosed by a cover plate 43 fastened to the crank case side wall.

In operation, the rotation of the engine crank shaft 40 causes the sleeve valve driving shaft 32 to be rotated through the pinion 39, gear wheel 38, worm 36 and worm wheel 35. Thus, the pin 30 on the sleeve valve driving shaft 32 is rotated and the coupling rod 27 reciprocated backwards and forwards while moving from a higher to a lower plane and vice versa, the arrangement being such that the crank pins 12 and the sleeve valve driving members 3 are also rotated.

The rotary movement of the crank pins 7 on the outer parts 5 of the sleeve valve driving members causes the sleeve valves 2 to move within the cylinders with a combined oscillatory and reciprocatory motion. The object of the four keyways in the outer parts 5 of the sleeve valve driving members 3 is to permit of the order of firing of the cylinders being readily altered without any change in the gearing between the crank shaft and the sleeve valve driving shaft 32, as the key on the inner part 6 of the sleeve valve driving member has merely to be engaged in a different keyway 26 in the outer part 5.

In the modified form illustrated in Figures 6, 7 and 8, the sleeve valve driving member 3 is solid and is provided with a flange 44 on which is formed a crank pin 7 off-set from the centre of the flange and slidably engaged in a bearing 8 in the sleeve valve 2, as in the preceding construction. The flange 44 is rotatably arranged in a bearing 45 formed in the crank case side wall, the other end of the sleeve valve driving member being rotatably mounted in a flanged bearing 46 also fixed in the crank case side wall. A set screw 47, engaging a threaded aperture 48 in the driving member 3, bears against a washer 49 interposed between said screw and the driving member. Eccentrics 50, 51 and 52, are secured on each sleeve valve driving member and are engaged, respectively, by coupling rods 27, 27a, 27b. By the arrangement of a plurality of coupling rods, a more even torque is obtained on the sleeve valve driving members, owing to the elimination of dead centres.

As shown in Figure 8, each eccentric is secured on the sleeve valve driving member 3 by means of a key 53 engaging a keyway in the eccentric. The coupling rods are operated from the sleeve valve driving shaft 32 by means of eccentrics secured on the shaft and engaging said rods, the arrangement being similar to that illustrated in Figure 6. It should be noted that the operation of the sleeve valve driving arrangement in this case is the same as in the preceding case, as the effect of the eccentrics on the coupling rods is precisely the same as that of the off-set pins in the preceding case.

Having now fully described my invention, what I claim and desire to secure by Letters Patent is:—

1. In a multi-cylinder internal combustion engine having sleeve valves, the combination of apertures in the crank case side wall, bearings arranged therein, sleeve valve driving members comprising relatively adjustable inner and outer parts whereby the order of firing of the cylinders may be changed, said outer parts being rotatably mounted in said bearings, crank pins on the outer parts and engaging with the sleeve valves, a coupling rod, a sleeve valve driving shaft and crank pins on said shaft and on the inner parts of the sleeve valve driving members for engaging with the coupling rod.

2. In a multi-cylinder internal combustion engine having sleeve valves, the combination of apertures in the crank case side wall, bearings arranged therein, sleeve valve driving members comprising relatively adjustable inner and outer parts whereby the order of firing of the cylinders may be changed, said outer parts being rotatably mounted in said bearings, bearing members mounted for universal movement in the sleeve valves, crank pins on the outer parts of said driving members engaging in the bearing members, a coupling rod, bearings therein, a rotatable sleeve valve driving shaft and crank pins on the inner parts of the sleeve valve driving members and said shaft for engaging in the bearings in the coupling rod.

3. In a multi-cylinder internal combustion engine having sleeve valves, the combination of apertures formed in the crank case side wall, housing fixed therein, ball bearings arranged in the housings, sleeve valve driving members comprising relatively adjustable inner and outer parts whereby the order of firing of the cylinders may be changed, said outer parts being arranged in the said ball bearings, bearings mounted for universal movement in the sleeve valves, crank pins on the outer parts of the sleeve valve driving members engaging in said bearings, a coupling rod, ball bearings therein, a rotatable sleeve valve driving shaft, gearing for driving said shaft from the engine crank shaft and crank pins on the driving shaft and on the inner parts of the sleeve valve driving members for engaging in the ball bearings in the coupling rod.

4. In a multi-cylinder internal combustion engine having sleeve valves, the combination of apertures formed in the crank case side wall, housings fixed therein, ball bearings arranged in the housings, sleeve valve driving members comprising inner and outer parts, which latter are arranged in the said ball bearings, a plurality of keyways in the outer part of each sleeve valve driving member, a key on the inner part thereof for engaging with any of said keyways, whereby the order of firing of the cylinders can be altered, bearings mounted for universal movement in the sleeve valves, crank pins on the outer parts of the sleeve valve driving members engaging in said bearings, a coupling rod, ball bearings therein, a rotatable sleeve valve driving shaft, gearing for driving said shaft from the engine crank shaft and crank pins on the driving shaft and on the inner parts of the sleeve valve driving members for engaging in the ball bearings in the coupling rod.

5. In a multi-cylinder internal combustion engine having sleeve valves, the combination of cylinders, a single sleeve valve oscillatably and slidably arranged in each of said cylinders, a piston slidably arranged in each sleeve valve, apertures in the crank case side wall, housings fixed therein, ball bearings arranged in the housings, sleeve valve driving members comprising inner and outer parts, which latter are arranged in the said ball bearings, a plurality of keyways in the outer part of each sleeve valve driving member, a key on the inner part thereof for engaging with any of said keyways, whereby the order of firing of the cylinders can be altered, bearings mounted for universal movement in the sleeve valves, crank pins on the outer parts of the sleeve valve driving members engaging in said bearings, a coupling rod, ball bearings therein, a rotatable sleeve valve driving shaft, gearing for driving said shaft from the engine crank shaft, crank pins on the driving shaft and on the inner parts of the sleeve valve driving members for engaging in the ball bearings in the coupling rod and a cover for enclosing the coupling rod and the sleeve valve driving members.

ARCHIE MACPHAIL NIVEN.